United States Patent [19]
Yeh

[11] 4,085,368
[45] Apr. 18, 1978

[54] INTERFERENCE CANCELING METHOD AND APPARATUS

[75] Inventor: Yu Shuan Yeh, Freehold Township, Monmouth County, N.J.

[73] Assignee: Bell Telephone Laboratories, Incorporated, Murray Hill, N.J.

[21] Appl. No.: 718,555

[22] Filed: Aug. 30, 1976

[51] Int. Cl.$^2$ ............................................. H04B 7/08
[52] U.S. Cl. .................................. 325/304; 325/473; 325/368; 325/371
[58] Field of Search ............... 325/301, 302, 303, 304, 325/305, 473, 476, 366, 367, 368, 369, 371, 377, 474, 477, 65; 343/100, 854; 340/155, 185

[56] References Cited

U.S. PATENT DOCUMENTS

| | | | |
|---|---|---|---|
| 3,092,776 | 6/1963 | Castellini | 325/474 |
| 3,177,489 | 4/1965 | Saltzberg | 343/100 |
| 3,202,990 | 8/1965 | Howells | 343/100 |
| 3,435,453 | 3/1969 | Howard | 343/100 |
| 3,471,788 | 10/1969 | Bickford et al. | 325/369 |
| 3,475,687 | 10/1969 | Pierce | 325/367 |
| 3,611,381 | 10/1971 | Preikschat et al. | 343/100 |
| 3,815,028 | 6/1974 | Rabow | 325/304 |
| 3,911,364 | 10/1975 | Langseth et al. | 325/301 |

OTHER PUBLICATIONS

"Adaptive Antenna Systems", by B. Widrow, et al., Proceedings of the IEEE, vol. 55, No. 12, (1967), pp. 2143-2159.
"Null-Steeromg Array for RPV Application," by G. G. Rassweiler, et al., IEEE 1974, International Conference on Communications, pp. 10E-1, to 10E-6.
An Adaptive Array for Interference Rejection in a Coded Communication System — by Reinhard, pp. i–iv and 1-10.
An Adaptive Array for Interference Rejection — by Riegler, et al., Proceedings of the IEEE, vol. 61, No. 6, June 1973.
Application of Adaptive Arrays to Suppress Strong Jammers in the Presence of Weak Signals — by Zahn, IEEE Transactions on Aerospace and Electronic System, vol. AES-9, No. 2, 3/73, pp. 260-271.
Adaptive Arrays — by Applebaum, Syracuse University Research Corp., SPL TR 66-1, Aug. 1966, pp. 1-47.

*Primary Examiner*—Robert L. Griffin
*Assistant Examiner*—Tommy P. Chin
*Attorney, Agent, or Firm*—James F. Hollander

[57] ABSTRACT

Apparatus for canceling interference suitable for use in conjunction with stationary phased array antennas or transducer arrays designed for satellite or other communication systems employing N-phase PSK (Phase Shift Keying) modulation is disclosed. The techniques used in the apparatus involves processing of signals received by a main array and an auxiliary array of a phased array antenna so that an error signal is derived which is fed back to circuitry which modifies at least one signal received by the auxiliary array. The modified signal or signals are summed with the signal received by the main array so that a sum wave is generated whose interference component is minimal.

The feedback circuitry exponentiates or raises the sum wave to the $N^{th}$ power to eliminate modulation, since the $N^{th}$ power of an N-phase PSK signal is a narrowband carrier. Then a term proportional to the desired signal raised to the $N^{th}$ power is filtered from the exponentiated sum wave and the remainder is utilized for error signal purposes. This technique operates without sacrificing bandwidth or degrading the desired signal and permits reception of signals with frequency spectra substantially overlapping one another.

11 Claims, 4 Drawing Figures

INTERFERENCE CANCELING METHOD AND APPARATUS

BACKGROUND OF THE INVENTION

This invention relates to interference suppression apparatus and more particularly to an interference suppression apparatus suitable for use in satellite or other communication systems employing N-phase PSK (Phase Shift Keying) modulation.

Interference in a communication system may be defined as any unwanted signal or noise that interferes with reception or transmission of a desired signal. In communication systems employing directional antennas, such as satellite communication systems interference can be caused by the reception of cochannel signals through the side lobes of either the receiving satellite or ground station antenna.

Various processing schemes are known in the prior art for the reduction of interference. Techniques such as described by B. Saltzberg in U.S. Pat. No. 3,177,489 require an auxiliary directional canceling antenna to be aimed at each interfering source. In addition, the desired signal received by the auxiliary antenna must be weaker than the interference received by the auxiliary antenna. Such technique suffers the disadvantage that each canceling antenna must be aimed so that its received main lobe corresponds in direction to signals interfering with the desired signal of the main antenna and its received side lobes correspond in direction to the desired signal of the main antenna.

U.S. Pat. No. 3,435,453 issued to D. D. Howard describes the use of a canceling subarray in a phased array antenna system. The technique is basically that of replacing the auxiliary directional antenna as above described by a broadbeam phased array, and employing a side lobe canceler such as described in U.S. Pat. No. 3,202,990 issued to P. W. Howells. Such a canceler suffers the disadvantage, however, of being unable to avoid partial cancellation of the desired signal when desired signal energy enters the subarray with similar strength cochannel signals and noise as contemplated in communication system applications.

Another technique for interference suppression known in the prior art requires that the desired signal be modulated with a known wideband pseudorandom code. Such techniques involve the sacrifice of bandwidth and the use of additional spectrum space because the pseudorandom code used is usually many times the bandwidth of the transmitted signal.

SUMMARY OF THE INVENTION

In accordance with the present invention, adaptive interference suppression in high frequency communications systems employing N-phase PSK modulation is achieved without disadvantageous desired-signal degradation or wasted bandwidth. Received waveforms consisting of both signal and interference are added to produce a sum wave having a sum interference component and a desired N-phase PSK sum signal component. The sum wave is then exponentiated or raised to the $N^{th}$ power to produce an exponentiated sum wave having an exponentiated signal component. The exponentiatd signal component, instead of being N-phase PSK, is an extremely narrowband carrier devoid of modulation because of the exponentiation. Even when there is substantial spectrum overlap of cochannel N-phase PSK signals, only one being desired, in the sum wave, the narrowband $N^{th}$ power carrier of any one of them can readily be identified, thereby enabling bandwidth to be conserved by deliberate spectrum overlap in the system design without need of any wideband pseudorandom codes. The narrowband exponentiated desired signal component is then readily removed without significantly affecting the rest of the exponentiated sum wave, leaving as remainder a first error signal which can be applied as a feedback signal to circuitry to modify at least one of the received waves in both amplitude and phase or in phase only before summation. The error signal is highly advantageous because a null in the interference which is to be obtained by received wave modification necessarily corresponds to a null in the error signal as will be shown hereinafter. The feedback and modifying circuitry just mentioned drives the interference to a minimum in response to the error signal with negligible desired signal degradation.

DETAILED DESCRIPTION

Figure 1:
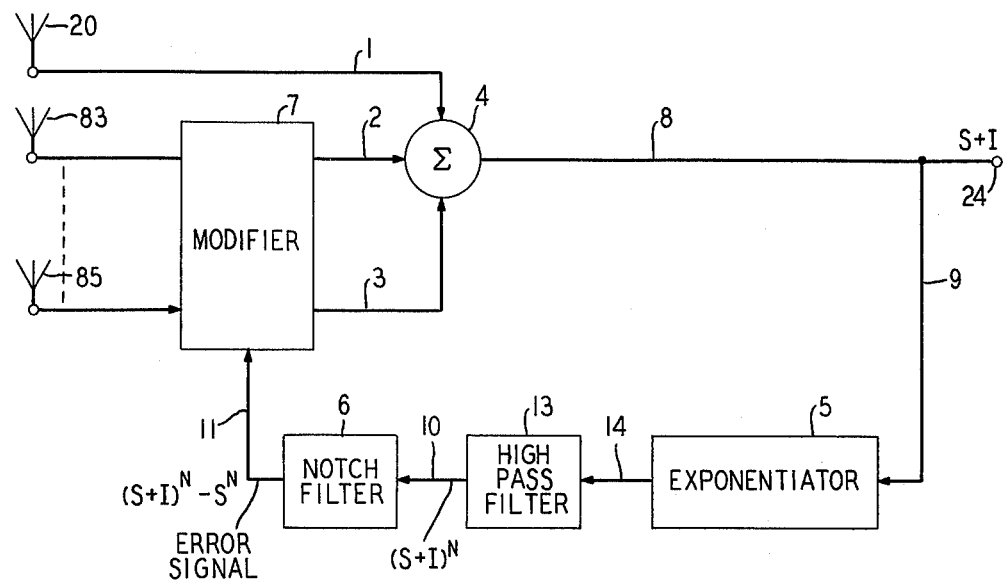
FIG. 1 shows a block diagram of interference canceling apparatus constructed in accordance with the invention.
Figure 2:
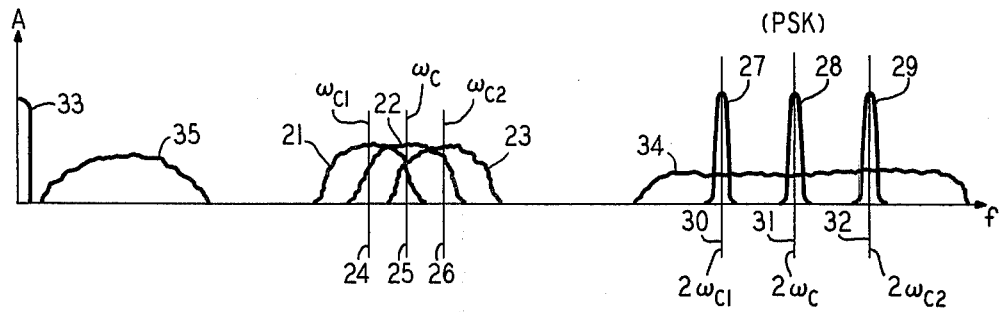
FIG. 2 shows a frequency distribution of waveforms found at various locations in FIG. 1.

A plurality of signals are applied to summer 4 via a plurality of leads, three of which (leads 1, 2 and 3) are shown in FIG. 1. These signals in general may be broadband overlapping phase-shift-keyed digital signals each centered about a different center frequency. Frequency distributions 21, 22 and 23 for the signals present on lead 1 in FIG. 1 are shown in FIG. 2; they represent such signals centered about frequencies 24, 25 and 26 respectively. One of these received signals will be the desired signal and others will be the interference signals.

The system 20, 83, and 85 is suitably a transducer array or a phased array antenna which can be a stationary device with receiving and transmitting elements which are selectively phase shifted to change the directivity of the system. A desired signal and undesired interference, which can include both undesired cochannel signals and noise, are received by both main array 20, which can be a single highly directional antenna element, and a plurality of auxiliary interference canceling elements 83 through 85 chosen in number suitably about equal to or greater than the number of sources of the interference. Interfering signals, noise and desired signal are therefore present on each of leads 1, 2 and 3.

Main array element 20 is highly directional and aimed to receive the desired signal. The auxiliary array elements 83 through 85 of the phased array antenna feeding leads 2 and 3 are less directional than the main array elements feeding lead 1 because the direction from which the interference emanates is unknown. An advantage of the present invention is that the interference cancellation is based on the knowledge of the carrier frequency of the desired signal. Therefore, it is not necessary to know the direction from which the interference comes in order to minimize the interference. Since the interference magnitude does not have to be greater than the magnitude of the desired signal in the auxiliary array, the auxiliary array does not require large gain.

Complex envelope notation is used herein as a shorthand to represent the real time waveforms to be discussed. A complex envelope representation is completely specified by a complex quantity and a carrier frequency. For example, a signal at frequency $\omega_c$ has a real time waveform $$\text{Re } \{S \, e^{j\omega_c t}\}. \tag{1}$$

The desired N-phase PSK signal modulation is specified as S at frequency $\omega_c$ with S given by $$S = e^{j\Phi_K}. \tag{1A}$$

Here $\Phi_K$ represents the information transmitted at the $K^{th}$ bit interval and $\Phi_K$ can be any of the following values: 0, $$\frac{2\pi \times 1}{N}, \frac{2\pi \times 2}{N}, \ldots \frac{2\pi(N-1)}{N}.$$

The real time waveform according to expression (1) is $$\text{Re } \{e^{j\Phi_K} e^{j\omega_c t}\} = \cos(\omega_c t + \Phi_K). \tag{2}$$

The center frequency $\omega_c$ of the signal modulation is indicated by 25 and the modulation spectrum S of the signal is indicated by 22 in FIG. 2.

An important characteristic of the N-phase PSK modulation is that $N\Phi_K$ is always a multiple of $2\pi$ and thus contains no modulation. Stated alternatively, by raising a N-phase PSK signal to the $N^{th}$ power, a continuous wave having theoretically zero bandwidth is obtained. For example from equation (1A), $S^N = e^{jN\Phi_K} = 1$.

The cochannel interference signals are also suitably N-phase PSK modulated but their carrier frequencies $\omega_{c1}$ and $\omega_{c2}$ in FIG. 2 are different from $\omega_c$ by predetermined amount. The first cochannel interference signal, referred in frequency to $\omega_c$, is $$I_1 = e^{j\Phi'_K + j(\omega_{c1} - \omega_c)t} \tag{3}$$

where $\Phi'_K$ is the $I_1$ information modulation which can assume any of the following values:

$$0, \frac{2\pi \times 1}{N}, \frac{2\pi \times 2}{N}, \ldots \frac{2\pi(N-1)}{N}.$$

The real time waveform of $I_1$, is
$$\text{Re } \{I_1 e^{j\omega_c t}\} = \text{Re } \{e^{j\Phi'_K + j\omega_{c1} t}\} = \cos|\omega_{c1} t + \Phi'_K|. \tag{4}$$

The center frequency $\omega_{c1}$ and the spectrum of $I_1$ are indicated by 24 and 21 in FIG. 2, respectively. Similarly, the spectrum 23 and $\omega_{c2}$ center frequency 26 of a second interference signal $I_2$ are indicated in FIG. 2.

The output at a frequency $\omega_c$ on lead 8 in FIG. 1 given by expression (5) is a sum wave having a sum interference component and a sum signal component $$S_m + S_A + I \tag{5}$$

where $S_m$ is the complex envelope of the signal received by the main array. $S_m$ differs from S by just a complex constant which represents the gain of the main array. $S_A$ is the signal received by the auxiliary array and I is the sum of all the interferences received by both the main and auxiliary array.

The sum wave of expression (5) is sampled and processed by a feedback loop consisting of lead 9, exponentiator 5, filters 13 and 6 and modifier 7. Each lead 2 and 3 from an auxiliary array element is coupled to modifier 7.

Exponentiator 5 is an $N^{th}$ power device, that is, it raises its input to the $N^{th}$ power. The exponentiator is a square law circuit for $N=2$, or can be two square law circuits in cascade for $N=4$, for example. Mixers may be used in a variety of connection arrangements for multiplying a cascade output with outputs of intermediate stages or the input itself to produce exponentiation for any integer N. For a two-phase PSK system, $N=2$, and exponentiator 5 is simply a squarer which raises the waveform described by expression (5) to the second power and produces a voltage on lead 14 represented by expression (6).

$$[\text{Re}\{[S_m + S_A + I] \, e^{j\omega_c t}\}]^2 \tag{6}$$

Expression (6) can be simplified, neglecting a factor of one-half, to $$|S_m + S_A + I|^2 + \text{Re}\{[S_m + S_A + I]^2 \, e^{j2\omega_c t}\}. \tag{7}$$

The first term in expression (7) is the lower sideband product of the square law device and consists of dc terms and intermodulation terms which are shown in FIG. 2 by 33 and 35. For example, $|S_m + S_A|^2 = |A \cdot S|^2 = |Ae^{j\Phi_K}|^2 = |A|^2$ and is a dc term when two-phase PSK modulation is used and where A represents the gain of the main and auxiliary array. $(S_m + S_A) I^* + (S_m + S_A)^* I + I^* I$ represents the intermodulation terms shown by spectrum 35 in FIG. 2.

The second term in expression (7) is centered around $2\omega_c$. Its spectrum consists of a line spectrum 27, 28, 29 and a spread out spectrum 34. For example, $[S_m + S_A]^2 = [Ae^{j\Phi_K}]^2 = A^2 e^{j2\Phi_K} = A^2$ represents a carrier of theoretically zero bandwidth at $2\omega_c$ indicated by 28 of FIG. 2. Also, since the cochannel two-phase PSK portion of interference I consists of $I_1, I_2, \ldots I_L$, the expression $I^2$ includes $I_1^2, I_2^2, \ldots I_L^2$ each yielding distinct spectral lines such as are indicated by 27 and 29 in FIG. 2. The cross modulation terms in $\text{Re}\{[2[S_m + S_A] I + I^2] e^{j2\omega_c t}\}$ are indicated by 34 in FIG. 2.

High pass filter 13 eliminates the spectral components in the exponentiated sum wave corresponding to the first term or lower sideband product of expression (7) and the high passed output on lead 10 at a frequency $2\omega_c$ is represented by $$\text{Re}\{[S_m + S_A + I]^2 \, e^{j2\omega_c t}\}. \tag{8}$$

Filter 6 is a notch filter (a narrowband reject filter) which rejects the narrowband carrier term at $2\omega_c$ represented by $\text{Re}\{[S_m + S_A]^2 \, e^{j2\omega_c t}\}$ with negligible distortion of the rest of the spectrum. The resulting error signal on lead 11 is composed of mostly interference terms and is given by $\text{Re}\{[2(S_A + S_m) I + I^2] e^{j2\omega_c t}\}$. Modifier 7 responsive to the error signal on lead 11 varies the interfering signals received by auxiliary elements 83 through 85 in amplitude and phase so that when all signals are added in summer 4, the sum wave on lead 8 contains a minimum of interference.

For an N-phase system, raising the sum wave on lead 9 to the $N^{th}$ power in exponentiator 5 and filtering the resultant waveform in high-pass filter 13 produces a signal of the form $$(S_m + S_A + I)^N \qquad (9)$$

at a frequency $N\omega_c$ on lead 10. Notch filtering $(S_m + S_A)^N$ in filter 6 produces an error signal of the form $$(S_m + S_A + I)^N - (S_m + S_A)^N \qquad (10)$$

on lead 11. For N=2 the error signal on lead 11 is $2(S_m + S_A)I + I^2$ and for N=4 the error signal is $4(S_m + S_A)^3 I + 6(S_m + S_A)^2 I^2 + 4(S_m + S_A) I^3 + I^4$. All terms present in the error signal for any N in general at the output of notch filter 6 have I as a factor and, therefore, minimizing the error signal necessarily drives I to zero in the interference cancellation apparatus of the invention.

Figure 3:
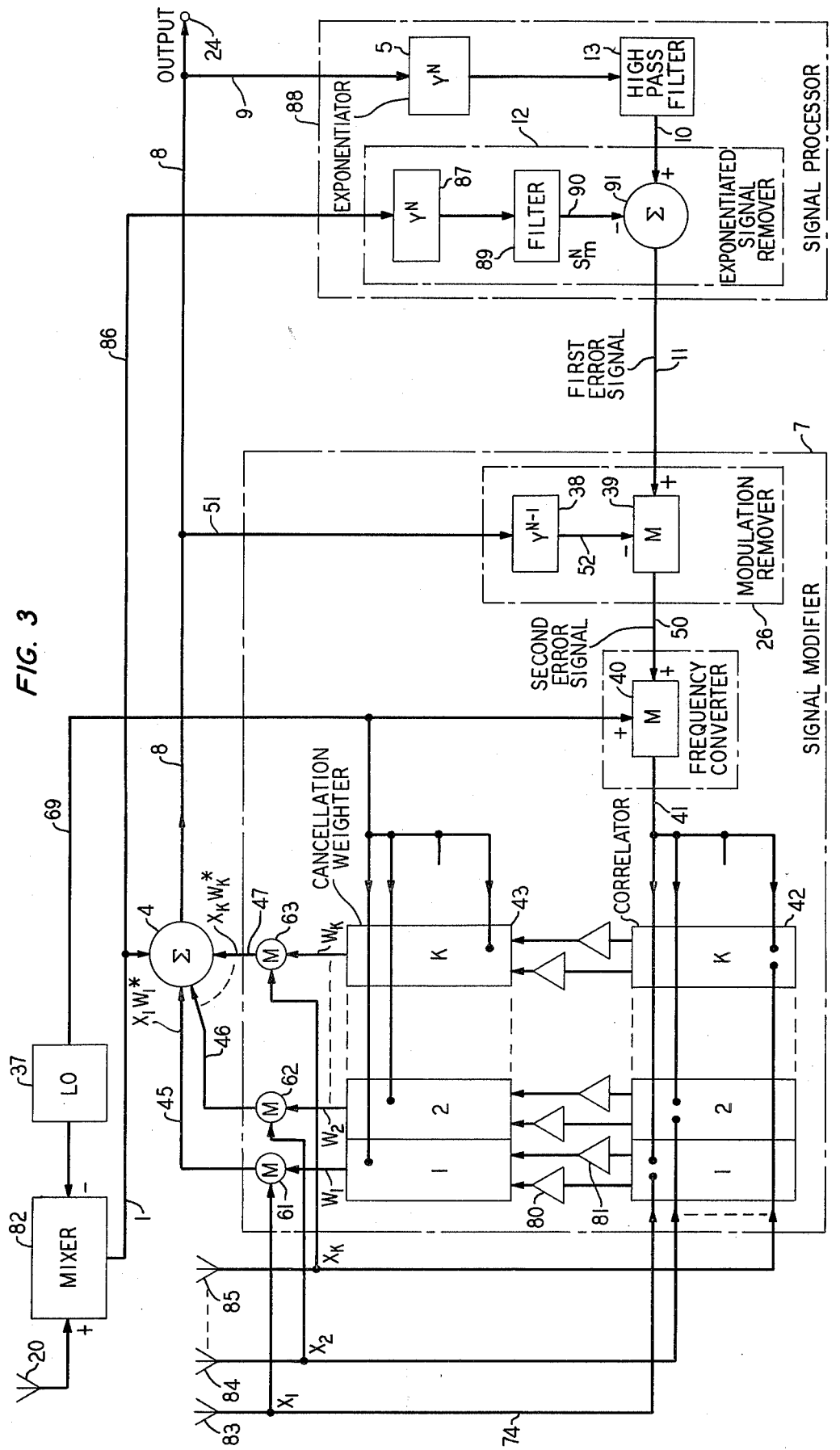
FIG. 3 is a detailed block diagram of a preferred embodiment of the invention.

FIG. 3 shows a detailed block diagram of a preferred embodiment of the invention. Signal, cochannel interference and noise interference are received by the main element or array 20 of the phased array antenna comprising elements 20, 83, 84, 85. Main array 20 is a highly directional element designed to maximize gain of the desired signal. Elements 83, 84 and 85 are part of the auxiliary array of the phased array antenna. Only three such elements are shown in FIG. 3, but as suggested therein many more auxiliary elements or arrays can be utilized. These elements may be regarded as the interference canceling array elements and in general may have low gain and be highly nondirectional. It is an advantage of the invention that these elements are non-directional because the technique of the invention does not require that the direction of the source of noise and interference be known. Waves received by main element 20 and the output of a local oscillator 37 are applied to mixer 82 which produces a heterodyned signal at an intermediate radian frequency $\omega_c$ on lead 1. The signal on lead 1 may be represented as $S_m + I_m + N_m$ where $S_m$ is the desired signal received by the main array, $I_m$ is the cochannel interference received by the main array and $N_m$ is noise interference.

The signals $X_1, X_2, \ldots X_K$ received by interference canceling auxiliary elements 83, 84 and 85 are applied to mixers 61, 62 and 63, respectively. The signals $X_1, X_2, \ldots X_K$ are each composed of desired signal, undesired cochannel interference and noise interference. The signals $X_1, X_2, \ldots X_K$ differ from one another only in phase due to the different angles of arrival of a received wave at elements 83, 84 and 85. These signals may be represented mathematically by the following equations:

$$X_1 = S_1 e^{j\theta_1} + I_1 e^{j\theta_{11}} + I_2 e^{j\theta_{21}} \qquad (11)$$
$$+ \ldots + I_L e^{j\theta_{L1}} + n_1$$

$$X_2 = S_1 e^{j\theta_2} + I_1 e^{j\theta_{12}} + I_2 e^{j\theta_{22}} \qquad (12)$$
$$+ \ldots + I_L e^{j\theta_{L2}} + n_2$$

$$\vdots$$

$$X_K = S_1 e^{j\theta_K} + I_1 e^{j\theta_{1K}} + I_2 e^{j\theta_{2K}} \qquad (13)$$
$$+ \ldots + I_L e^{j\theta_{LK}} + n_K$$

where $\theta_{pq}$ is the phase angle of the $p^{th}$ interfering signal at the $q^{th}$ element, L is the total number of interfering cochannel signals I and $n_K$ is the thermal and other noise on the $K^{th}$ element of the auxiliary array. Thus, for example, $\theta_{11}$ is the phase angle of the received interference signal $I_1$ on antenna element 83. $\theta_q$ is the phase angle of the desired signal $S_1$ at the $q^{th}$ element of the auxiliary array.

The output of local oscillator 37 is not only applied to mixer 82 but is also applied via lead 69 to each section 1, 2, ... K of a cancellation weighter 43. Each section of cancellation weighter 43 produces a weight signal or function $W_1, W_2, \ldots W_K$, respectively, as will be explained in detail in relation to FIG. 4. Mixers 61, 62 and 63 which are suitably considered a part of each weighter section respectively, multiply the signals $X_1, X_2, \ldots X_K$ by $W_1, W_2, \ldots W_K$, respectively, to produce heterodyned IF signals on leads 45, 46 and 47. The complex conjugate of the weighting functions $W_1, W_2, \ldots W_K$ may be represented by $W_1^*, W_2^*, \ldots W_K^*$. The signals on leads 45, 46 and 47 may be represented respectively by $X_1 W_1^*, X_2 W_2^*$ and $X_K W_K^*$. The desired signal received by the main array and the cochannel interference received by the main array may be defined respectively as $$S_m = E_o S_1 \qquad (14)$$

$$I_m = E_1 I_1 + E_2 I_2 + \ldots E_L I_L \qquad (15)$$

where $E_o$ is the electric field pattern of the main array in the direction of $S_1$ and $E_1, E_2, \ldots E_L$ is the electric field pattern (side lobe strength) of the main array in the direction of $I_1, I_2, \ldots I_L$.

The signal on lead 1 derived from the main array and the weighted signals on leads 45, 46 and 47 derived from auxiliary array elements 83, 84 and 85 are combined in a combiner, or summer, 4. The output at a frequency $\omega_c$ of combiner 4 on lead 8 may be represented by $$S_m + S_A + I_m + I_A + N_A + N_m \qquad (16)$$

It is desired in a preferred embodiment to force the sum $S_A + I_m + I_A + N_A + N_m$ to zero by a feedback process to suppress all interference to and degradation of desired signal $S_m$, where $$S_A + I_A + N_A = X_1^* W_1 + \ldots + X_K W_K^* \qquad (17)$$

$$S_A = (e^{j\theta_1} W_1^* + e^{j\theta_2} W_2^* + \ldots + e^{j\theta_K} W_K^*) S_1 \qquad (18)$$

$$I_A = (e^{j\theta_{11}} W_1^* + e^{j\theta_{12}} W_2^* + \ldots + e^{j\theta_{1K}} W_K^*) I_1 \qquad (19)$$
$$+ (e^{j\theta_{21}} W_1^* + e^{j\theta_{22}} W_2^* + \ldots + e^{j\theta_{2K}} W_K^*) I_2$$

$$\vdots$$

$$+ (e^{j\theta_{L1}} W_1^* + e^{j\theta_{L2}} W_2^* + \ldots + e^{j\theta_{LK}} W_K^*) I_L.$$

$I_m$ is the main array cochannel interference as described by equation (15). $N_A$ and $N_m$ are the sum of all noise on the elements of the auxiliary array and on the elements of the main array, respectively.

The feedback process and apparatus for accomplishing the interference cancellation will now be even more fully described relative to the preferred embodiment of FIG. 3. The signal on lead 86 expressed by $S_m + I_m + N_m$ is applied to exponentiator 87 of exponentiated-signal remover 12 of signal processor 88. Remover 12 replaces notch filter 6 of FIG. 1. For a two-phase PSK system, $N=2$ and the output of exponentiator 87 is expressed by $$S_m^2 + 2S_m(I_m + N_m) + (I_m + N_m)^2. \quad (20)$$

$S_m^2$ is a continuous wave carrier without modulation since all of the two-phase PSK desired signal modulation is lost by raising the signal to the second power. The remaining terms in expression (20) are broadband cochannel interference and noise terms such as 34 and line spectrum terms such as 27 and 29 of FIG. 2. Narrow bandpass filter 89 which is centered at $2\omega_c$ eliminates these noise and interference terms and produces on lead 90 a signal $S_m^2$ only.

The signal on lead 8 (see equation (16)) is applied via lead 9 to exponentiator 5 and the output thereof is in turn applied to high pass filter 13 to eliminate lower sideband products. The resulting signal on lead 10 is of the form $$S_m^2 + 2S_m(S_A + I_m + I_A + N_A + N_m) + (S_A + I_m + I_A + N_A + N_m)^2. \quad (21)$$

Exponentiators 5 and 87 are suitably identical and may be constructed appropriately for a given value of N. $S_m^2$ is subtracted, or removed, in combiner 91 from the signal on lead 10 given by expression (21) to produce on lead 11 a first error signal voltage centered about a frequency $2\omega_c$ of the form $$\epsilon = 2S_m(S_A + I_m + I_A + N_A + N_m) + (S_A + I_m + I_A + N_A + N_m)^2. \quad (22)$$

It is this error signal voltage which is then used to drive the signal modifier 7 circuitry of FIG. 3 so that everything but the desired signal $S_m$ is suppressed at output 24, or at least minimized relative to the desired signal in average power. It will be noted that in the preferred embodiment of FIG. 3, which does not employ a notch filter, only $(S_m)^N$ is subtracted, or removed, from the signal on lead 10. In the embodiment shown in FIG. 1 employing a notch filter 6 and described in relation to expression (10), the exponentiated sum $(S_m + S_A)^N$ is subtracted, or removed from the signal on lead 10.

The following heuristic explanation of modifier 7 circuit operation to minimize the error signal of equation (22) is based on the fact that $S_A$, $I_A$, $I_m$, $N_m$ and $N_A$ are usually much smaller than $S_m$. $S_m$ is designated the dominant (first order) term and $(S_A + I_m + I_A + N_A + N_m)$ is designated the second order term which is neglected when appropriate due to its small size in the heuristic explanation. Later an exact mathematical discussion is presented which shows that the signal processor exactly minimizes equation (22) without approximation.

Modulation remover 26 removes the signal modulation $S_m$ from the dominant term of the first error voltage (see equation (22)) so that a second error signal on lead 50 has a dominant term void of signal modulation. This removal operation is accomplished as follows. The signal on lead 51 centered about frequency $\omega_c$, is applied to exponentiator 38. For the case where $N=2$, the exponentiator 38 may merely be a conductor since its output is simply $$S_m + S_A + I_m + I_A + N_A + N_m \quad (23)$$

on lead 52, the same as on lead 51. $S_m$ is the dominant term. The dominant term in the error voltage $\epsilon$ of equation (22) is $2S_m(S_A + I_m + I_A + N_A + N_m)$. To eliminate $S_m$ as a factor from this dominant term, the error voltage $\epsilon$ is mixed in mixer 39 with the combiner output voltage on lead 52 given by expression (23). Mixer 39 is a down converter and the output on lead 50 is a second error voltage centered about the frequency $\omega_c$ shown in FIG. 2. The output on lead 50 is dominated by $$2S_m S_m^*(S_A + I_m + I_A + N_m + N_A) = 2(S_A + I_m + I_A + N_m + N_A) \quad (24)$$

Equation (24) is valid for two-phase PSK modulation since $S_m S_m^* = 1$, disregarding the constant $E_o^2$ (equation (14)). The right-hand side of equation (24) is now the expression to be minimized.

Frequency converter 40 is an up-converter which produces on lead 41 a frequency shifted version of the second error voltage translated from $\omega_c$ to $\omega_c + \omega_{LO}$. Up-conversion is needed so that all inputs to correlator 42 are at the same frequency so that the correlator sections operate properly to produce baseband signal outputs.

Correlator 42 performs the function of multiplying the second error voltage up-converted on lead 41 with the signals received by the interference canceling elements 83, 84, . . . 85, the signals being provided as inphase and quadrature inputs. The outputs of each section 1, 2, . . . K of correlator 42 contain information about the amplitude and phase relationship of $X_1$, . . . $X_K$ to the second error signal. This information is fed into cancellation weighter 43 to change $W_1$, . . . $W_K$ in a direction to minimize the power content (mean square value) of the second error voltage used to control cancellation weighter 43. The details of the operation of the correlator will be described in relation to FIG. 4.

The above is an approximate explanation of the circuitry which leads to the minimization of $\epsilon$ given in equation (22). In what follows, an exact mathematical description of the circuits is given.

Figure 4:
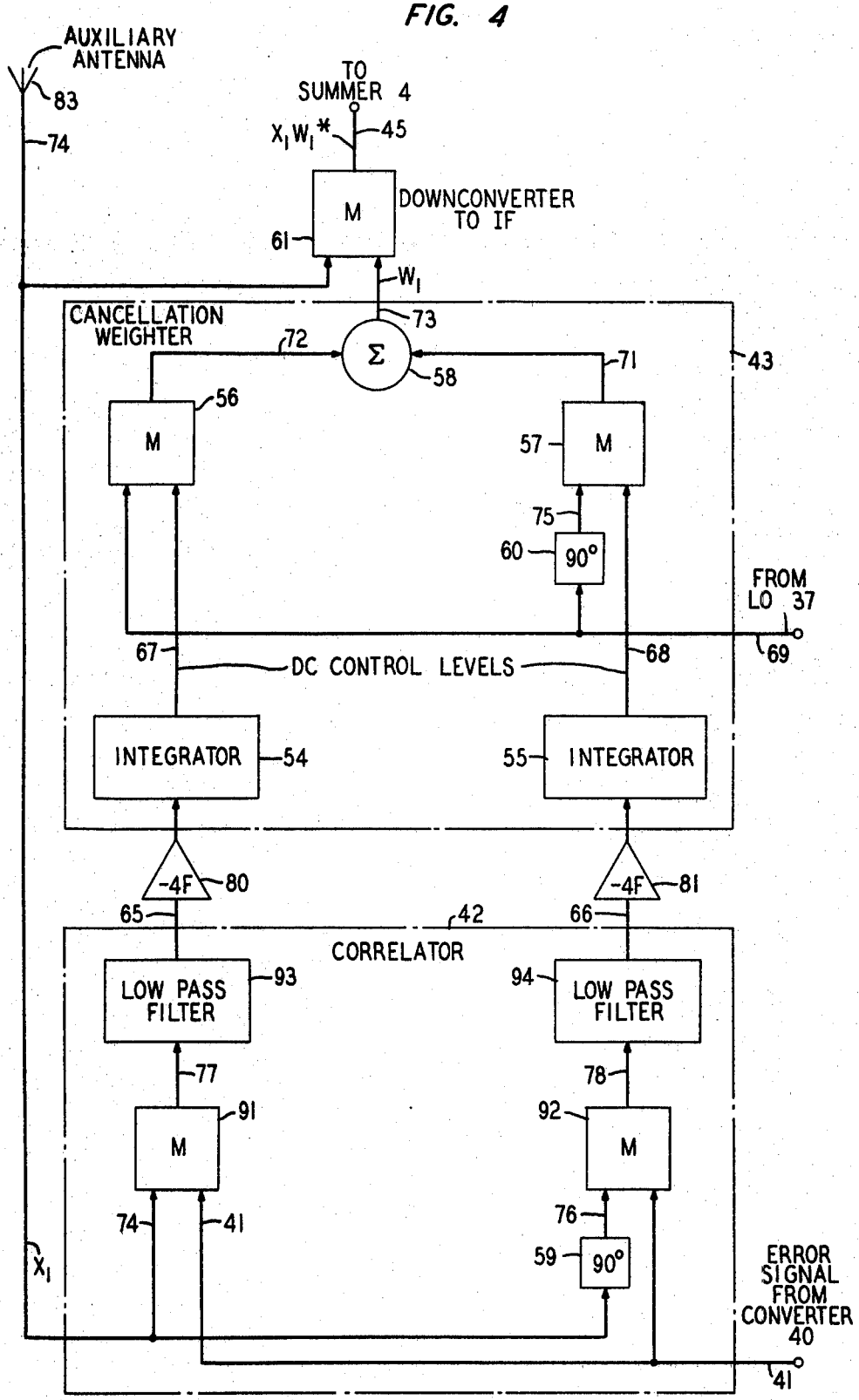
FIG. 4 is a detailed block diagram of sections of the cancellation weighter and correlator shown in FIG. 3.

FIG. 4 shows the details of one section of cancellation weighter 43 and correlator 42. Each unit 1, 2, . . . K of correlator 42 contains two mixers 91 and 92 and two low pass filters 93 and 94 which operate as quadrature detectors. The goal of the interference canceling circuit is to reduce and minimize by a feedback process the error signal $\epsilon$ on lead 11 of FIG. 3 given by equation (22) without reducing $S_m$. To achieve this goal $\overline{\epsilon\epsilon^*}$ is driven to a minimum by varying $W_1, W_2, \ldots W_K$ where $\overline{\epsilon\epsilon^*}$ is the average power or auto-correlation of $\epsilon$. $\overline{\epsilon\epsilon^*}$ can be minimized by employing signal modifier circuitry for implementing the gradient search method, which causes $W_1, W_2, \ldots W_K$ to vary at rates in time according to $$\frac{dW_1}{dt} = -F\nabla_{W_1}\overline{\epsilon\epsilon^*} \quad (25)$$

$$\vdots$$

$$\frac{dW_K}{dt} = -F\nabla_{W_K}\overline{\epsilon\epsilon^*} \quad (26)$$

where $\nabla$ indicates the gradient function and F is a gain constant (associated with amplifiers 80 and 81 for each correlator section in FIGS. 3 and 4) which determines the bandwidth of the feedback loop consisting of leads 8, 9, processor 88, lead 11, signal modifier 7, leads 45, 46 and 47 and summer 4.

$\nabla_{W_K}$ as used above is defined as follows:

$$\nabla_{W_K} = \frac{\delta}{\delta(ReW_K)} + j\frac{\delta}{\delta(ImW_K)} = 2\frac{\delta}{\delta W_K^*}. \tag{27}$$

Examination of equations (22) and (17) reveals that the only terms in the expression for $\epsilon$ which depend on $W_1^*, \ldots W_K^*$ are $I_A$, $S_A$ and $N_A$, as would be expected since the cancellation weighter only affects the cancellation array signals from elements 83, 84, ... 85 and not the signals and interference from main element 20.

Applying the identity (27) to the right-hand side of the gradient search equation (26) yields $$\nabla_{W_K}\overline{\epsilon\epsilon^*} = 2\overline{\epsilon^*\frac{\delta\epsilon}{\delta W_K^*}},$$

and substituting equations (22) and (17)

$$= 2\overline{\epsilon^*[2S_m X_K + 2(S_A + I_A + I_m + N_A + N_m) X_K]} = \tag{28}$$
$$4\overline{\epsilon^*[S_m + S_A + I_A + I_m + N_A + N_m]X_K}.$$

Thus, to implement the gradient search the respective weights must each vary at a rate given by $$\frac{dW_K}{dt} = -4F\overline{\epsilon^*(S_m + S_A + I_A + I_m + N_A + N_m)X_K}. \tag{29}$$

Now all factors on the right-hand side of equation (29) are available: gain $-4F$ from amplifiers 80 and 81, $\epsilon$ on lead 11, summer 4 output $(S_m + \ldots + N_m)$ on lead 51, and $X_K$ from auxiliary element 83.

The signal modifier 7 of FIGS. 3 and 4 indeed accomplishes the gradient search as will now be shown. The signal on lead 41 is the upper sideband mixing product output of frequency converter 40. This signal on lead 41 at a frequency $\omega_c + \omega_{LO}$ may be written as $$\epsilon^*[S_m + \ldots + N_m]. \tag{30}$$

The signal on lead 74 at a frequency $\omega_c + \omega_{LO}$ is received by an interference canceling element and is represented in general by equation (13). In FIG. 4, only one interference canceling element 83 is illustrated by example. Signal $X_1$ is applied directly to mixer 91 and via a 90 degrees phase shifter 59 to mixer 92. The signal on lead 76 at a frequency $\omega_c + \omega_{LO}$ may be represented mathamatically by $$jX_1 \tag{31}$$

where $j$ is the square root of $-1$. Since the inputs to mixer 91 on leads 74 and 41 are at the same frequency, the lower sideband product output of mixer 91 on lead 77 is a baseband signal which may be represented by $$Re\{X_1 \epsilon^*[S_m + \ldots + N_m]\}. \tag{32}$$

Low pass filter 93 is a time averaging device which produces on lead 65 the baseband signal represented by expression (31).

$$Re\overline{\{X_1 \epsilon^*[S_m + \ldots + N_m]\}} \tag{33}$$

This baseband signal is amplified by inverting amplifier 80 having gain equal to $-4F$ and integrated by integrator 54 to produce on lead 67 a signal of the form $$\int_{-\infty}^{t} -4F\,Re\,\overline{\{X_1 \epsilon^*[S_m + \ldots + N_m]\}}\,dt. \tag{34}$$

The signal on lead 78 like the signal on lead 77 is a lower sideband mixing product at baseband and may be represented by $$Re\{\epsilon^*[S_m + S_A + \ldots + N_A + N_m](jX_1)\}. \tag{35}$$

The signal represented by expression (35) can be rewritten as $$Re\{j\epsilon^*[S_m + \ldots + N_m]X_1\} = -Im\{\epsilon^*[S_m + \ldots + N_m]X_1\}. \tag{36}$$

This signal represented by the right-hand side of equation (36) is low pass filtered by filter 94 to produce on lead 66 a signal of the form $$-Im\overline{\{\epsilon^*[S_m + \ldots + N_m]X_1\}}. \tag{37}$$

This filtered signal is amplified by inverting amplifier 81 having gain $-4F$ and integrated to produce on lead 68 a signal of the form $$4F\int_{-\infty}^{t} Im\overline{\{\epsilon^*[S_m + \ldots + N_m]X_1\}}\,dt. \tag{38}$$

The output from local oscillator 37 on lead 69 may be represented as $$\cos \omega_{LO}t. \tag{39}$$

This signal is applied to mixer 56 and via 90° phase shifter 60 to mixer 57. The signals on leads 71 and 72 may be represented by $$4F\left[\int_{-\infty}^{t} Im\overline{\{\epsilon^*[S_m + \ldots + N_m]X_1\}}\,dt\right]\sin \omega_{LO}t \tag{40}$$

and $$-4F\left[\int_{-\infty}^{t} Re\overline{\{\epsilon^*[S_m + \ldots + N_m]X_1\}}\,dt\right]\cos \omega_{LO}t \tag{41}$$

respectively. These signals are added in summer 58 to produce a weighted local oscillator signal $W_1$ on lead 73 of the form $$4F\left[\int_{-\infty}^{t} Im\overline{\{\epsilon^*[S_m + \ldots + N_m]X_1\}}\,dt\right]\sin \omega_{LO}t \tag{42}$$
$$-4F\left[\int_{-\infty}^{t} Re\overline{\{\epsilon^*[S_m + \ldots + N_m]X_1\}}\,dt\right]\cos \omega_{LO}t.$$

The weighted signal on lead 73 may also be defined as $$Re[We^{j\omega_{LO}t}] = W_R \cos \omega_{LO}t - W_I \sin \omega_{LO}t. \tag{43}$$

Comparing equations (43) and (42), it can be seen that $$W_R = -4F \int_{-\infty}^{t} Re \overline{\{\epsilon^*[S_m + \ldots + N_m]X_1\}} \, dt \qquad (44)$$

and $$W_I = -4F \int_{-\infty}^{t} Im \overline{\{X_1 \epsilon^*[S_m + \ldots + N_m]\}} \, dt. \qquad (45)$$

Taking the derivatives of equations (45) and (44), we obtain $$\frac{d}{dt} W_R = -4F \, Re \, \overline{\{X_1 \epsilon^*(S_m + \ldots + N_m)\}} \qquad (46)$$

and $$\frac{d}{dt} W_I = -4F \, Im \, \overline{\{X_1 \epsilon^*(S_m + \ldots + N_m)\}}. \qquad (47)$$

Since W is a complex quantity, the relationship $$\frac{dW}{dt} = \frac{DW_R}{dt} + j\frac{dW_I}{dt} \qquad (48)$$

is valid and the right-hand side of equation (48) is $$-4F \, \overline{\{X_1 \epsilon^*(S_m + \ldots + N_m)\}}. \qquad (49)$$

It is apparent that expression (49) is identical in form to that in equation (28) and accordingly the construction of signal modifier 7 is shown to be such that the signals have been properly combined to minimize interference.

In all cases it is to be understood that the above-described arrangements are merely illustrative of a small number of the many possible applications of the principles of the invention. For instance, the frequency ranges utilized, the modes of generating appropriate signals for the correlator inputs, and the type of minimization process selected and variables used therein may be so chosen as to be best suited for the application at hand. A multiplicity of cochannel signals, each being a desired signal, may be isolated from one another by a multiplicity of feedback loops designed according to the invention. Numerous and varied other arrangements in accordance with these principles may readily be devised by those skilled in the art without departing from the spirit and scope of the invention.

What is claimed is:

1. An interference reduction apparatus for use with a plurality of waves each having components of signal and interference, said apparatus comprising:
    means for summing said waves, producing a sum wave having a sum interference component and a sum signal component;
    means for raising said sum wave to a power, producing an exponentiated sum wave having an exponentiated signal component;
    means for substantially removing said exponentiated signal component from said exponentiated sum wave, producing a first error signal; and
    means responsive to said first error signal for modifying at least one of said waves before summing, whereby said first error signal and said sum interference component are reduced.

2. Apparatus as claimed in claim 1 wherein said means for removing said exponentiated signal component from said exponentiated sum wave includes a high pass filter responsive to the exponentiated sum wave, and a notch filter, responsive to the output of said high pass filter, for producing said error signal.

3. Apparatus as claimed in claim 1 wherein said apparatus further includes a main array and an auxiliary array for providing said plurality of waves.

4. Apparatus as claimed in claim 5 wherein said plurality of waves include N-phase phase-shift-keyed (PSK) signals, where N is an integer greater than one, and said means for substantially removing said exponentiated signal component comprises an exponentiator responsive to a heterodyned version of at least one of said N-phase PSK signals provided by said main array for producing an exponentiated main array signal raised to a power equal to the number N of phases of modulation, a filter responsive to said exponentiated main array signal for producing a filtered exponentiated main array signal, and a summer responsive to said filtered exponentiated main array signal and to a high pass filtered version of said exponentiated sum wave for producing said first error signal.

5. Apparatus as claimed in claim 4 wherein said means responsive to said first error signal is a modifier circuit responsive to said first error signal, to said sum wave, to a local oscillator, and to said N-phase PSK signals received by said auxiliary array.

6. Apparatus as claimed in claim 3 wherein said modifier means includes a modulation remover responsive to said first error signal and said sum wave to produce a second error signal which is substantially free of modulation due to said sum signal component;
    said modifier means further including at least one correlator section, each said correlator section being responsive to a wave provided by an associated auxiliary array element and also responsive to said second error signal;
    said modifier means further including at least one cancellation weighter section, each said weighter section being responsive to the output of an associated correlator section, and a wave provided by an associated auxiliary array element, the output of each cancellation weighter being applied to said means for summing.

7. Apparatus as claimed in claim 6 wherein said modulation remover includes an exponentiator responsive to said sum wave for producing a version of said sum wave raised to the power $N-1$, said modulation remover further including a mixer responsive to said sum wave raised to the power $N-1$ and to said first error signal for producing said second error signal.

8. Apparatus as claimed in claim 6 wherein said apparatus is of a type comprising a local oscillator having an output applied to a mixer for heterodyning a main array wave to produce an intermediate frequency main array wave;
    said modifier means further includes a frequency converter responsive to the output of said local oscillator and said second error signal for producing a frequency shifted version of said second error signal, the frequency of said frequency shifted version being approximately equal to the frequency of said waves provided by said auxiliary array so as to be able to be applied to each said correlator section; and
    each said cancellation weighter section is responsive to the output of said local oscillator and said associated correlator section to produce a weighted local oscillator signal for heterodyning with said wave provided by said associated auxiliary array element to produce said weighter output at approximately said intermediate frequency;

each said weighter output and said intermediate frequency main array wave being applied to said means for summing.

9. Apparatus as claimed in claim 1 wherein said plurality of waves are heterodyned to an intermediate frequency by heterodyning means and said summing means sums the waves as so heterodyned.

10. In a method for reducing interference to a signal in a communication system utilizing a plurality of waves each having components of interference and said signal, the steps comprising:

summing said waves to produce a sum wave having a sum interference component and a sum signal component;

raising said sum wave to a power to produce an exponentiated sum wave having an exponentiated signal component;

substantially removing said exponentiated signal component from said exponentiated sum wave to produce an error signal; and modifying at least one of said plurality of waves before summing in a manner such as to substantially minimize said error signal in average power by a feedback process utilizing said error signal, whereby said sum interference component is substantially reduced relative to said sum signal component.

11. The method of claim 10 wherein said feedback process comprises the steps of correlating at least one of said plurality of waves with said error signal to produce a correlation output and said modifying step includes weighting each said at least one of said plurality of waves in accordance with said correlation output.

* * * * *